(12) United States Patent
Li et al.

(10) Patent No.: US 12,344,764 B2
(45) Date of Patent: Jul. 1, 2025

(54) METHOD FOR PREPARING ANTIBACTERIAL AND FRESH-KEEPING FRUIT-PACKAGING MATERIAL THROUGH THREE-DIMENSIONAL PRINTING

(71) Applicant: Jiangsu University, Jiangsu (CN)

(72) Inventors: Zhihua Li, Jiangsu (CN); Xiaowei Huang, Jiangsu (CN); Xiaobo Zou, Jiangsu (CN); Liuzi Du, Jiangsu (CN); Jiyong Shi, Jiangsu (CN); Zhikun Yang, Jiangsu (CN); Shaoyi Cen, Jiangsu (CN); Junjun Zhang, Jiangsu (CN); Ning Zhang, Jiangsu (CN); Wei Sun, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 18/681,852

(22) PCT Filed: Sep. 14, 2023

(86) PCT No.: PCT/CN2023/118762
§ 371 (c)(1),
(2) Date: Feb. 6, 2024

(87) PCT Pub. No.: WO2024/046488
PCT Pub. Date: Mar. 7, 2024

(65) Prior Publication Data
US 2025/0136825 A1    May 1, 2025

(30) Foreign Application Priority Data
Aug. 31, 2022    (CN) .......................... 202211057354.0

(51) Int. Cl.
*C09D 5/14*     (2006.01)
*B29C 64/118*   (2017.01)
(Continued)

(52) U.S. Cl.
CPC ................ *C09D 5/14* (2013.01); *B33Y 70/10* (2020.01); *B65D 81/24* (2013.01); *B65D 85/34* (2013.01);
(Continued)

(58) Field of Classification Search
CPC ...... B65D 65/38–466; B65D 81/24–28; B29L 2031/712
See application file for complete search history.

(56) References Cited

FOREIGN PATENT DOCUMENTS

| CN | 106750569 | 5/2017 |
|---|---|---|
| CN | 108503901 | 9/2018 |

(Continued)

OTHER PUBLICATIONS

Suresh, Siva Nandhini, et al. "Gum acacia/pectin/pullulan-based edible film for food packaging application to improve the shelf-life of ivy gourd." International Journal of Food Science and Technology 57.9 (2022): 5878-5886. (Year: 2022).*

(Continued)

*Primary Examiner* — Susan D Leong
*Assistant Examiner* — Vipul Malik
(74) *Attorney, Agent, or Firm* — JCIPRNET

(57) ABSTRACT

A method for preparing an antibacterial and fresh-keeping fruit-packaging material through three-dimensional (3D) printing includes the following steps: dissolving gum arabic and pullulan separately in deionized water to obtain a gum arabic solution and a pullulan solution; subjecting a probiotic to cultivation, centrifugation, and resuspension to obtain a bacterial suspension; mixing the bacterial suspension, the gum arabic solution, and the pullulan solution to obtain a core layer solution; mixing polyvinyl chloride, a modifier, and a plasticizer to obtain a shell layer solution; injecting the shell layer solution and the core layer solution into two syringes, respectively; conducting coaxial 3D printing to (Continued)

finally obtain a coaxial 3D printing product with a core-shell structure; and conducting uniaxial 3D printing with the shell layer solution alone to form an outer layer on the coaxial 3D printing product to obtain the antibacterial and fresh-keeping fruit-packaging material with inner and outer layers.

5 Claims, 3 Drawing Sheets

(51) Int. Cl.
*B29K 27/06* (2006.01)
*B29K 105/00* (2006.01)
*B29L 31/00* (2006.01)
*B33Y 70/10* (2020.01)
*B65D 81/24* (2006.01)
*B65D 85/34* (2006.01)
*C09D 105/00* (2006.01)
*C09D 127/06* (2006.01)

(52) U.S. Cl.
CPC ......... *C09D 105/00* (2013.01); *C09D 127/06* (2013.01); *B29C 64/118* (2017.08); *B29K 2027/06* (2013.01); *B29K 2105/0035* (2013.01); *B29K 2105/0038* (2013.01); *B29L 2031/712* (2013.01)

(56) References Cited

FOREIGN PATENT DOCUMENTS

| CN | 110551709 | 12/2019 | |
|----|-----------|---------|---|
| CN | 111802636 | 10/2020 | |
| CN | 115260604 | 11/2022 | |
| EP | 3485918 | 5/2019 | |
| EP | 3721721 A1 * | 10/2020 | ............ A23P 20/105 |

OTHER PUBLICATIONS

Ma, Jiage, et al. "Electro-encapsulation of probiotics in gum Arabic-pullulan blend nanofibres using electrospinning technology." Food Hydrocolloids 111 (2021): 106381. (Year: 2021).*

Luo, Jinjie, et al. "Fabrication of chitosan/hydroxyethyl cellulose/TiO2 incorporated mulberry anthocyanin 3D-printed bilayer films for quality of litchis." Foods 11.20 (2022): 3286. (Year: 2022).*

"International Search Report (Form PCT/ISA/210) of PCT/CN2023/118762", mailed on Dec. 15, 2023, pp. 1-4.

"Written Opinion of the International Searching Authority (Form PCT/ISA/237) of PCT/CN2023/118762", mailed on Dec. 15, 2023, pp. 1-5.

* cited by examiner

METHOD FOR PREPARING ANTIBACTERIAL AND FRESH-KEEPING FRUIT-PACKAGING MATERIAL THROUGH THREE-DIMENSIONAL PRINTING

CROSS-REFERENCE TO RELATED APPLICATION

This is a 371 application of the International PCT application serial no. PCT/CN2023/118762, filed on Sep. 14, 2023, which claims the priority benefits of China Application No. 202211057354.0, filed on Aug. 31, 2022. The entirety of each of the above-mentioned patent applications is hereby incorporated by reference herein and made a part of this specification.

TECHNICAL FIELD

The present disclosure relates to a method for preparing an antibacterial and fresh-keeping fruit-packaging material through three-dimensional (3D) printing, and belongs to the field of novel food processing.

DESCRIPTION OF RELATED ART

Fruits are an important part of the people's diet, and are an important source of vitamins, dietary fibers, and phytochemicals. The adequate intake of fruits plays an important role in maintaining the physical health, improving the immunity, and reducing a risk of chronic diseases such as diabetes and hypertension. However, during storage and transportation, a fruit may undergo mechanical damage due to collision and spoilage due to contamination of microorganisms in an environment, which will destroy a flavor and taste of the fruit itself and make the fruit lose its own value. An anti-collision and fresh-keeping transparent fruit bagging has been disclosed, where a material with a specified thickness is used to fabricate a porous structure for collision prevention and fresh keeping. Although this fruit bagging can reduce the mechanical damage for fruits during storage to some extent, the porous structure makes the fruit bagging easily contaminated by external microorganisms, which will cause a decline of freshness of fruits. A peach-special fresh-keeping and anti-collision inflatable film bag has been disclosed, where a gas is filled in a specific material to play an anti-collision role. This method can reduce the mechanical damage for fruits to some extent. However, the film bag has a cumbersome structure, is difficult to prepare, and has a high economic cost, which is not conducive to the long-term development of an enterprise. In addition, this packaging material is non-degradable.

Probiotics are defined as live microorganisms that are beneficial to the human health when taken at an adequate amount. For example, probiotics can alleviate a gastrointestinal discomfort and regulate an intestinal function. The oral administration of probiotics can promote the metabolism of a human body, play the roles of lipid-lowering and weight-losing, and facilitate the health of human skin. However, the use of probiotics in the field of food packaging is rarely reported.

SUMMARY

In view of the deficiencies of fruit fresh-keeping and the easy damage of fruits during transportation currently, the present disclosure provides a 3D-printed packaging material with an inner layer for fresh-keeping and an outer layer for protection. In the present disclosure, a polysaccharide and polyvinyl chloride (PVC) are adopted as raw materials, and a coaxial 3D printing+uniaxial 3D printing technology is adopted. The method is specifically as follows: the PVC with excellent flame retardancy and a wide hardness range is loaded on a shell layer, and a probiotic with an antibacterial effect is encapsulated in a core layer to obtain a product with a core-shell structure; and then an anti-collision layer is printed on the core-shell structure through uniaxial 3D printing to improve a protection ability of the outer layer.

The present disclosure achieves the above technical objective through the following technical solutions.

The present disclosure provides a method for preparing a probiotic-containing packaging material with PVC and a polysaccharide through 3D printing, specifically including the following steps:

(1) preparation of a core layer solution: dissolving gum arabic in deionized water to obtain a gum arabic solution with a mass concentration of 10% to 15%; dissolving pullulan in deionized water to obtain a pullulan solution with a mass concentration of 10% to 15%; subjecting a probiotic to inoculation and cultivation, centrifugation, and resuspension to obtain a bacterial suspension with a bacterial concentration of $10^9$ 1g to $10^{10}$ 1g (CFU/g); and mixing the bacterial suspension, the gum arabic solution, and the pullulan solution in a mass ratio of 1: (3-4): (1-3), and sealing and stirring a resulting mixed solution to obtain the core layer solution;

(2) preparation of a shell layer solution: mixing PVC, a modifier, and a plasticizer, and thoroughly stirring a resulting mixture to obtain the shell layer solution, where the polyvinyl chloride, the modifier, and the plasticizer are mixed in a mass ratio of 100: (5-10): (20-30) and the modifier is chlorinated polyethylene; and (3) preparation of the antibacterial and fresh-keeping fruit-packaging material: with the shell layer solution and the core layer solution as 3D printing solutions, conducting coaxial 3D printing and uniaxial 3D printing as follows:

injecting the shell layer solution obtained in the step (2) and the core layer solution obtained in the step (1) into two syringes, respectively; conducting the coaxial 3D printing with a propulsion rate of the shell layer solution greater than a propulsion rate of the core layer solution to finally obtain a coaxial 3D printing product with a core-shell structure on a bottom plate of a device; and conducting the uniaxial 3D printing with the shell layer solution alone to form an outer layer on the core-shell structure of the coaxial 3D printing product to obtain the antibacterial and fresh-keeping fruit-packaging material with inner and outer layers, where the inner layer is used for keeping fruits fresh and the outer layer is used for protection of the fruits.

Preferably, in the step (1), the probiotic is any one selected from the group consisting of *Lactobacillus acidophilus, Lactobacillus casei, Bifidobacterium thermophilum,* and *Lactobacillus bulgaricus;* and the probiotic is cultivated specifically as follows: inoculating the probiotic at an inoculum size of (1-2) g: 100 mL into an MRS liquid medium, and cultivating the probiotic at 35° C. to 37° C. for 10 h to 12 h.

Preferably, in the step (3), the coaxial 3D printing is conducted with the following condition parameters: nozzle diameters: a diameter of a core layer nozzle: 0.8 mm to 1.4 mm, and a diameter of a shell layer nozzle: 1.7 mm to 2.5 mm; printing temperatures: a temperature of core layer printing: 25° C. to 40° C., and a temperature of shell layer printing: 30° C. to 60° C.; propulsion rates: the propulsion rate of the core layer solution: 5 mm/s to 8 mm/s, the propulsion rate of the shell layer solution: 15 mm/s to 40 mm/s, and a ratio of the propulsion rate of the core layer solution to the propulsion rate of the shell layer solution: 1:(3-5); and a printing speed: 15 mm/s to 30 mm/s.

Preferably, in the step (3), the uniaxial 3D printing is conducted with the following condition parameters: a nozzle diameter: 1.7 mm to 2.5 mm, a printing temperature: 30° C. to 60° C., and a printing speed: 15 mm/s to 30 mm/s.

The present disclosure further discloses use of the packaging material prepared by the method described above in bacterial resistance and fresh-keeping for a food.

The Present Disclosure has Following Advantages

In the 3D-printed probiotic-containing packaging material prepared with PVC and a polysaccharide in the present disclosure, a probiotic is printed in an inner layer through coaxial 3D printing. On the one hand, the probiotic can produce antibacterial ingredients such as extracellular polysaccharides to allow excellent fresh-keeping for fruits. On the other hand, the probiotic can have a positive impact on the health of a host and can prevent various diseases such as constipation and diarrhea. Therefore, the antibacterial ingredients can be in direct contact with a product to be preserved, which greatly improves an antibacterial effect without causing a harm to a human body.

The so-called fresh-keeping is allowed by the probiotic in the core layer solution, and this is because the probiotic includes a variety of bacteriocins that can play an antibacterial role to prolong a shelf life of a fruit. In addition, the modified PVC in the outer shell layer has an adjustable hardness and thus can well resist a mechanical damage caused by an external environment for a fruit in the outer layer. A shell with a similar shape to a fruit is printed with the two materials through coaxial 3D printing, and then an anti-collision layer is printed on the shell through uniaxial 3D printing to protect the fruit, which allows an improved fresh-keeping effect for the fruit.

In the 3D-printed probiotic-containing packaging material prepared with PVC and a polysaccharide in the present disclosure, a ratio of the PVC, the modifier, and the plasticizer in the shell layer solution can be adjusted to greatly improve the printability and hardness adjustability of a shell layer, which can well reduce a damage caused by an inevitable collision to fruits during storage and transportation to extend a fresh-keeping time of the fruits. As the ratio of the PVC, the modifier, and the plasticizer varies, a tensile strength of the packaging material continues to decrease, while an elongation at break of the packaging material continues to increase, indicating that the ratio of the PVC, the modifier, and the plasticizer has a specified impact on a mechanical strength of the packaging material. In particular, when the plasticizer is used in 20 parts to 30 parts and the modifier is used in 5 parts to 10 parts, the packaging material has an optimal mechanical strength.

The 3D-printed probiotic-containing packaging material prepared with PVC and a polysaccharide in the present disclosure is used for keeping fruits fresh mainly as follows: the probiotic in the inner layer can produce antibacterial active ingredients to slow down the spoilage of a fruit, and the modified PVC in the outer layer can reduce unnecessary mechanical damages to fruits during transportation, such that a combination of the probiotic and the modified PVC can greatly improve a fresh-keeping effect for fruits.

The packaging material designed in the present disclosure is prepared by a coaxial 3D printing+uniaxial 3D printing technology, where an inner layer is printed to allow a fresh-keeping effect, and an outer multi-thickness anti-collision layer is printed to play a vital role in reducing a mechanical damage to a fruit. In addition, the designed packaging material is safe and non-toxic, and can be in direct contact with a food.

DESCRIPTION OF THE EMBODIMENTS

In order to make the objective, the technical route, and the advantages of the present disclosure clearly understood, the present disclosure is further explained in detail with reference to the following specific embodiments and some accompanying drawings.

A probiotic is specifically cultivated as follows: under sterile conditions, 1 g of a bacterial powder is added to 50 mL of an MRS liquid medium and cultivated at 37° C. for 12 h, a resulting bacterial solution is centrifuged at 5,000 r for 5 min, and a resulting cell pellet is resuspended with normal saline to finally obtain a probiotic resuspension solution with a concentration of $10^9$ lg (CFU/g).

EXAMPLE 1

A method for preparing a probiotic-containing packaging material with PVC and a polysaccharide through coaxial 3D printing+uniaxial 3D printing, including the following steps:

(1) Preparation of a core layer solution: Gum arabic was dissolved in deionized water to obtain a gum arabic solution with a mass fraction of 20%; pullulan was dissolved in deionized water to obtain a pullulan solution with a mass fraction of 20%; and then a *Lactobacillus bulgaricus* resuspension solution, the gum arabic solution, and the pullulan solution were mixed and thoroughly stirred to obtain the core layer solution, where a mass ratio of the gum arabic solution, the pullulan solution, and the *Lactobacillus bulgaricus* suspension was set at 1:4:1, 1:4:1.5. 1:4:2, and 1:4:2.5.

(2) Preparation of a shell layer solution: PVC with a polymerization degree of 1,800, CPE as a modifier, and EVM as a plasticizer were mixed according to a specified ratio, then thoroughly stirred at 170° C., and then cooled to 60° C. to obtain the shell layer solution, where the ratio of the PVC, the CPE, and the EVM was set at 100:5:20, 100:6:22, 100:7:24, 100:8:25, 100:9:30, and 100:10:32.

(3) Preparation of the packaging material: A coaxial 3D printing+uniaxial 3D printing technology was adopted. The shell layer solution and the core layer solution were injected into two syringes, respectively.

Coaxial 3D printing was first conducted under the following condition parameters: a diameter of a core layer nozzle: 1.4 mm, a diameter of a shell layer nozzle: 2.5 mm, a temperature of core layer printing: 37° C., a temperature of shell layer printing: 60° C., and a printing speed: 25 mm/s.

Then, uniaxial 3D printing was conducted with the shell layer solution alone under the following condition parameters: a nozzle diameter: 2.5 mm, a printing temperature: 60° C., and a printing speed: 25 mm/s.

In order to well characterize antibacterial abilities of the packaging materials prepared above, survival rates of probiotics in the core layer solutions were tested.

Figure 1:
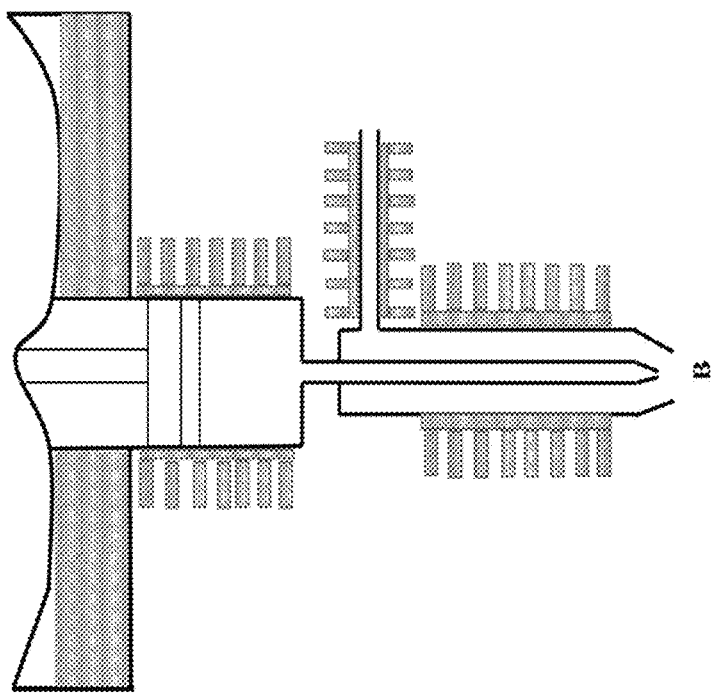
FIG. 1 is a schematic diagram of uniaxial (A) and coaxial (B) 3D printing devices.
Figure 1:
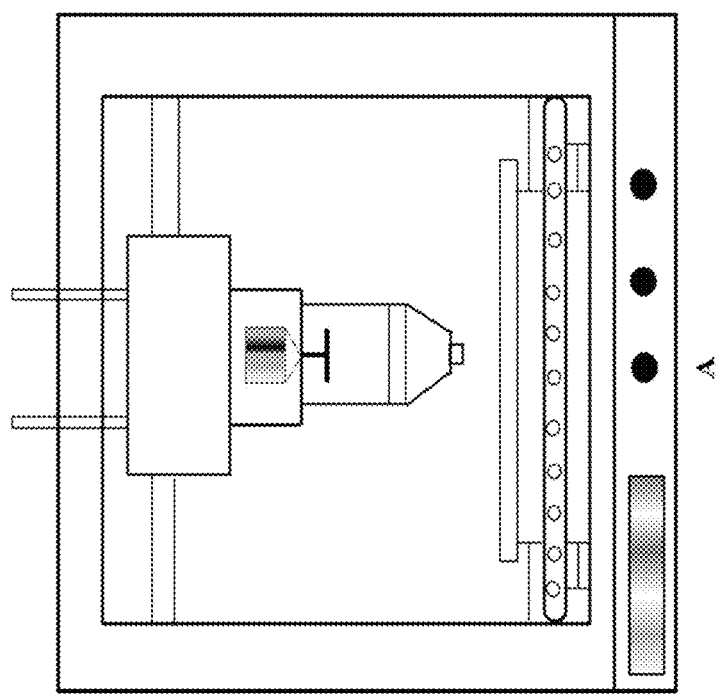
Figure 2:
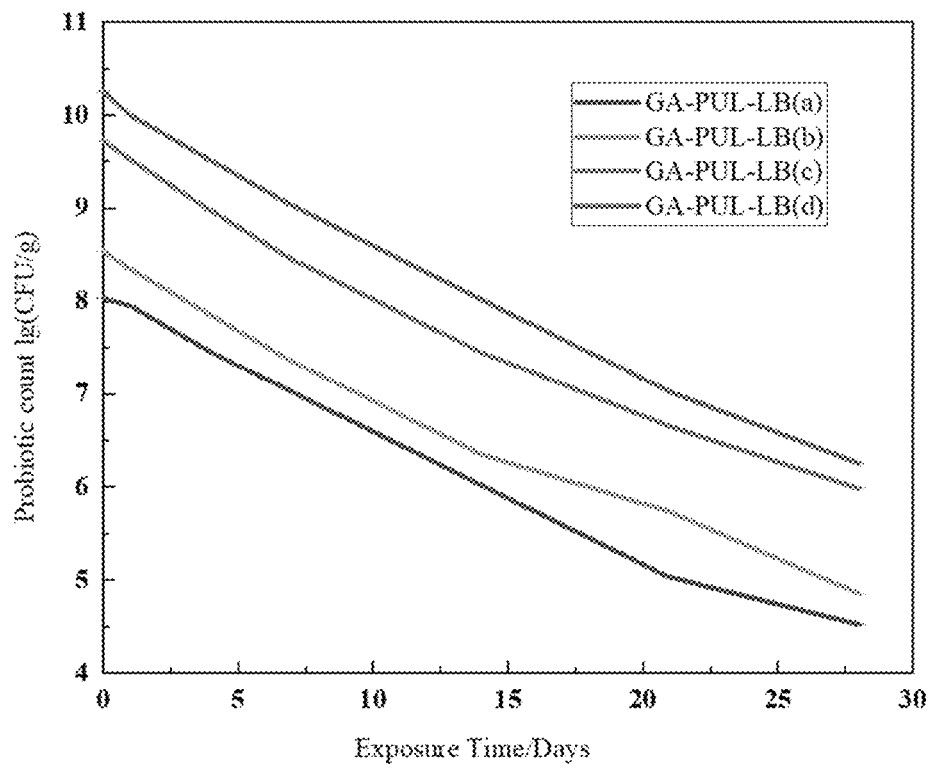
FIG. 2 shows survival rates of probiotics in three solutions with different ratios.

FIG. 2 shows survival rates of probiotics in mixed solutions of the gum arabic solution, the pullulan solution, and the bacterial suspension in different ratios, where GA-PUL-LB (a), GA-PUL-LB (b), GA-PUL-LB (c), and GA-PUL-LB (d) correspond to mass ratios of 1:4:1, 1:4:1.5, 1:4:2, and 1:4:2.5 for the gum arabic solution, the pullulan solution, and the bacterial suspension. It can be seen from FIG. 2 that, initially, a number of probiotics in GA-PUL-LB (a) is 8.03±0.12 [lg(CFU/g)], a number of probiotics in GA-PUL-LB (b) is 8.54±0.13 [lg(CFU/g)], a number of probiotics in GA-PUL-LB (c) is 9.72±0.15 [lg(CFU/g)], and a number of probiotics in GA-PUL-LB (d) is 10.15±0.17 [lg(CFU/g)]; after storage at room temperature for 28 d, a number of probiotics in GA-PUL-LB (a) is 4.82±0.16 [lg(CFU/g)], a number of probiotics in GA-PUL-LB (b) is 5.15±0.14 [lg(CFU/g)], a number of probiotics in GA-PUL-LB (c) is 6.28±0.18 [lg(CFU/g)], a number of probiotics in GA-PUL-LB (d) is 6.75±0.14 [lg(CFU/g)]; and compared with an initial colony number, a survival rate of GA-PUL-LB (a) is 60.02%, a survival rate of GA-PUL-LB (b) is 60.30%, a survival rate of GA-PUL-LB (c) is 64.61%, and a survival rate of GA-PUL-LB (d) is 66.50%. In summary, a packaging material prepared in the ratio range defined in the present disclosure can play an excellent fresh-keeping effect, and the higher the initial probiotic content, the higher the survival probiotic content after storage for 28 d, indicating that a high initial probiotic concentration allows a prominent fresh-keeping effect.

Figure 3:
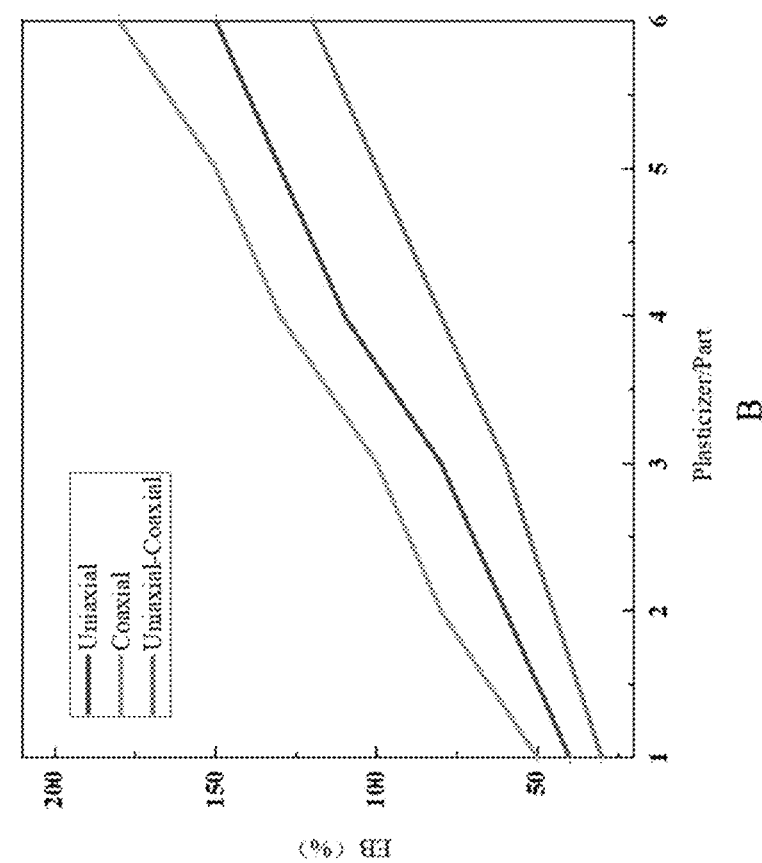
FIG. 3 shows tensile strength (A) and elongation at break (B) test results of packaging materials prepared with the PVC, the modifier, and the plasticizer in different ratios by different methods.
Figure 3:
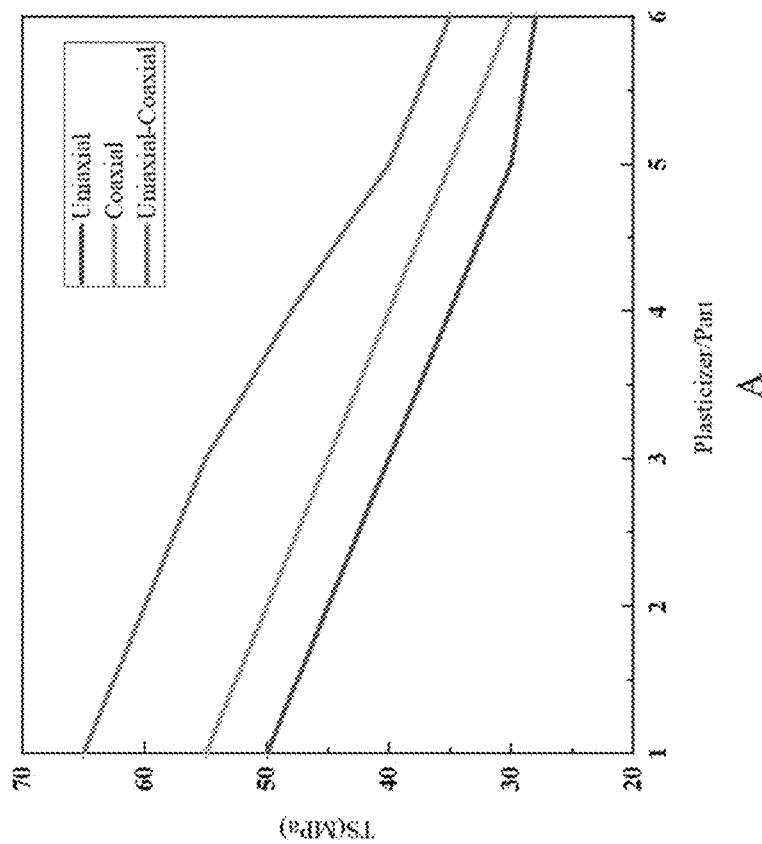

FIG. 3 shows tensile strength (A) and elongation at break (B) test results of packaging materials prepared with the PVC, the modifier, and the plasticizer in different ratios by different methods, where 1, 2, 3, 4, 5, and 6 on the horizontal axis represent the ratios of 100:5:20, 100:6:22, 100:7:24, 100:8:25, 100:9:30, and 100:10:32 for the PVC, the modifier, and the plasticizer in the shell layer solution, respectively; and uniaxial, coaxial, and uniaxial-coaxial represent uniaxial printing, coaxial printing, and uniaxial printing+coaxial printing, respectively.

It can be seen from FIG. 3 that, as the contents of the modifier and the plasticizer increase, a tensile strength of a packaging material tends to decrease, and an elongation at break of a packaging material tends to increase, indicating that the contents of the PVC, the modifier, and the plasticizer have an important impact on a mechanical strength of a packaging material. When the ratio of the PVC, the modifier, and the plasticizer is 100:25:8 and 100:30:9, tensile strengths and elongations at break of resulting packaging materials allow easy printing and easy forming, and the packaging materials can well exert an anti-collision function, indicating that the ratios are conducive to fresh-keeping for fruits.

It can also be seen from FIG. 3 that, at a fixed ratio of the PVC, the modifier, and the plasticizer, different printing methods (uniaxial printing, coaxial printing, and uniaxial printing+coaxial printing) also have a very important impact on a mechanical strength of a packaging material, and the different printing methods directly affect the performance of a packaging material. In particular, the uniaxial printing+coaxial printing method has a maximum impact on a mechanical strength of a packaging material.

It should be noted that the above example is merely intended to illustrate the present disclosure, rather than limit the technical solutions described in the present disclosure. Therefore, although the present disclosure is described in detail in this specification with reference to the above example, those of ordinary skill in the art should understand that the present disclosure can still be modified or equivalently replaced. All technical solutions and improvements thereof made without deviating from the spirit and scope of the present disclosure should be covered by the scope of the claims of the present disclosure.

What is claimed is:

1. A method for preparing an antibacterial and fresh-keeping fruit-packaging material through three-dimensional (3D) printing, comprising the following steps:
   (1) preparation of a core layer solution: dissolving gum arabic in deionized water to obtain a gum arabic solution with a mass concentration of 10% to 15%; dissolving pullulan in deionized water to obtain a pullulan solution with a mass concentration of 10% to 15%; subjecting a probiotic to inoculation and cultivation, centrifugation, and resuspension to obtain a bacterial suspension with a bacterial concentration of $10^9$ lg to $10^{10}$ lg (CFU/g); and mixing the bacterial suspension, the gum arabic solution, and the pullulan solution in a mass ratio of 1: (3-4): (1-3), and sealing and stirring a resulting mixed solution to obtain the core layer solution;
   (2) preparation of a shell layer solution: mixing polyvinyl chloride, a modifier, and a plasticizer, and thoroughly stirring a resulting mixture to obtain the shell layer solution, wherein the polyvinyl chloride, the modifier, and the plasticizer are mixed in a mass ratio of 100: (5-10): (20-30) and the modifier is chlorinated polyethylene; and
   (3) preparation of the antibacterial and fresh-keeping fruit-packaging material: with the shell layer solution and the core layer solution as 3D printing solutions, conducting coaxial 3D printing and uniaxial 3D printing as follows:
   injecting the shell layer solution obtained in the step (2) and the core layer solution obtained in the step (1) into two syringes, respectively; conducting the coaxial 3D printing with a propulsion rate of the shell layer solution greater than a propulsion rate of the core layer solution to finally obtain a coaxial 3D printing product with a core-shell structure on a bottom plate of a device; and
   conducting the uniaxial 3D printing with the shell layer solution alone to form an outer layer on the core-shell structure of the coaxial 3D printing product to obtain the antibacterial and fresh-keeping fruit-packaging material with inner and outer layers, wherein the inner layer is used for keeping fruits fresh and the outer layer is used for protection of the fruits.

2. The method for preparing the antibacterial and fresh-keeping fruit-packaging material through the 3D printing according to claim 1, wherein in the step (1), the probiotic is any one selected from the group consisting of *Lactobacillus acidophilus*, *Lactobacillus casei*, *Bifidobacterium thermophilum*, and *Lactobacillus bulgaricus*; and the probiotic is cultivated specifically as follows: inoculating the probiotic at an inoculum size of (1-2) g: 100 mL into an MRS liquid medium, and cultivating the probiotic at 35° C. to 37° C. for 10 h to 12 h.

3. The method for preparing the antibacterial and fresh-keeping fruit-packaging material through the 3D printing according to claim 1, wherein in the step (3), the coaxial 3D printing is conducted with the following condition parameters: nozzle diameters: a diameter of a core layer nozzle: 0.8 mm to 1.4 mm, and a diameter of a shell layer nozzle: 1.7 mm to 2.5 mm; printing temperatures: a temperature of core layer printing: 25° C. to 40° C., and a temperature of shell layer printing: 30° C. to 60° C.; propulsion rates: the propulsion rate of the core layer solution: 5 mm/s to 8 mm/s, the propulsion rate of the shell layer solution: 15 mm/s to 40 mm/s, and a ratio of the propulsion rate of the core layer solution to the propulsion rate of the shell layer solution: 1: (3-5); and a printing speed: 15 mm/s to 30 mm/s.

4. The method for preparing the antibacterial and fresh-keeping fruit-packaging material through the 3D printing according to claim 1, wherein in the step (3), the uniaxial 3D printing is conducted with the following condition parameters: a nozzle diameter: 1.7 mm to 2.5 mm, a printing temperature: 30° C. to 60° C., and a printing speed: 15 mm/s to 30 mm/s.

5. Use of a packaging material prepared by the method according to claim 1 in bacterial resistance and fresh-keeping for a food.

* * * * *